United States Patent [19]

Knoll et al.

[11] Patent Number: 4,541,693

[45] Date of Patent: Sep. 17, 1985

[54] METHOD OF MAKING COLOR-NEUTRAL LCD INDICATORS OF LOW RESIDUAL TRANSMISSION

[75] Inventors: Peter Knoll, Ettlingen; Peter Rapps, Karlsruhe; Wolfgang Ziegler, Fürth, all of Fed. Rep. of Germany

[73] Assignee: Robert Bosch GmbH, Stuttgart, Fed. Rep. of Germany

[21] Appl. No.: 535,805

[22] Filed: Sep. 26, 1983

[30] Foreign Application Priority Data

Nov. 30, 1982 [DE] Fed. Rep. of Germany ....... 3244248

[51] Int. Cl.[4] .................... G02F 1/133; G02F 1/137
[52] U.S. Cl. .................... 350/339 F; 350/349
[58] Field of Search .................... 350/339 F, 349

[56] References Cited

U.S. PATENT DOCUMENTS

| 3,551,026 | 12/1970 | Heilmeier | 35/349 |
| 4,035,060 | 7/1977 | Tsunoda et al. | 350/339 F X |
| 4,241,339 | 12/1980 | Ushiyama | 350/349 |
| 4,257,682 | 3/1981 | Suzuki et al. | 350/349 |

*Primary Examiner*—John K. Corbin
*Assistant Examiner*—David Lewis
*Attorney, Agent, or Firm*—Frishauf, Holtz, Goodman & Woodward

[57] ABSTRACT

The disturbing residual transmission of a liquid crystal display device which is particularly noticeable in negative contrast devices is reduced by reference to the fact that the residual transmission is colored. The entire display surface of the liquid crystal device is provided with a transparent covering of a color complementary to the residual transmission color when the liquid crystal is not turned on. The transparent colored covering can be applied by printing as well as otherwise. In another embodiment, color shifts between turned-on and not turned-on displays are counteracted by mixing into the liquid crystal material a dichroic coloring material which has much lower absorption when the display is turned on. A light blue dichroic coloring material is suitable for LCDs which have residual transmission in the red region.

6 Claims, 3 Drawing Figures

METHOD OF MAKING COLOR-NEUTRAL LCD INDICATORS OF LOW RESIDUAL TRANSMISSION

This invention concerns a method of making color-neutral negative-contrast liquid crystal display controlled indicator devices with reduced residual transmission for reducing the noticeability of indicator segments that are not turned on and increasing the contrast between the activated and inactivated appearance of the segments, particularly in the case of negative contrast indicators.

The residual transmission of liquid crystal indicators in negative contrast is already well known. In the case of known liquid crystal displays, efforts are made to suppress this residual transmission by the admixture of black dyes to the liquid crystal material. This remedy has the disadvantage, however, that such admixtures reduce the clear state transmission of the liquid crystal indicator. Especially with LCD indicators having high residual transmission, that remedy is frequently unusable because of the poor transmission in the clear state that results from the necessary admixture of black dye.

SUMMARY OF THE INVENTION

It is an object of the present invention to reduce the visibiliy of the residual transmission of unactivated negative contrast liquid crystal displays without substantial impairment of the contrast of the activated display. In particular, it is an object of the present invention to make use of the color of the residual transmission for the purpose of attaining the aforesaid objective.

Briefly, in a first embodiment of the invention the display surface of the liquid crystal indicator is covered with a transparent film of a color complementary to the liquid crystal residual transmission color. The transparent film may be applied as a foil or as a printed or otherwise deposited layer on the surface. In another embodiment, a dichroic coloring material is mixed into the liquid crystal material. In the first embodiment it is also possible to provide the coloring layer in the form of a layer containing a dichroic coloring material.

The method of the invention has the advantage that on the one hand a decisive improvement of the visual appearance of the indications of the device is obtained, and on the other hand a substantial contrast improvement results. There is the further advantage that a simple fitting of the hue of the added coloring material or layer to the color temperature of the light source used to illuminate the liquid crystal display can be provided. Furthermore, disturbing colors that appear because of the physical properties of the liquid crystal are suppressed.

Printing the coloring material on the indicator display is particularly convenient. It is also desirable to select the coloring material so that it is complementary to the color of the liquid crystal display segments in their inactivated state, which is to say when they are not turned on electrically (hereinafter referred to as their "non-turned-on state"). Thus, the dark surrounding field where color changes would be annoyingly noticeable is shown uniformly in the desired color.

The use of one or more dichroic coloring materials mixed into the liquid crystal material is also effective for the practice of the invention. In this manner, the result can be obtained that both the non-turned-on zone of the display and the turned-on zones may have a hueless appearance. It is particularly advantageous for the dichroic coloring material to have an absorption that differs according to whether the liquid crystal cell is turned on or not. The dichroic material preferably has a color which is complementary to the residual transmission of the liquid crystal. In that manner a hueless appearance is obtained and also optimum contrast.

BRIEF DESCRIPTION OF THE DRAWINGS

The invention is described in further detail with reference to the annexed drawing, in which.

DESCRIPTION OF THE PREFERRED EMBODIMENTS

Liquid crystal indicators, particularly those of the twisted nematic type, which are operated in negative contrast, have a colored residual transmission which arises as the result of interference between the ordinary and extraordinary rays. Since liquid crystals constitute a medium having double refraction, these two sets of rays have different indices of refraction. As a result of the interference between the two rays which is produced by the double refraction index, color effects occur when the light comes out of the doubly refractive medium. The thinner the liquid crystal layer is, the more intense are the color effects and the stronger is the residual transmission. By the optimized manufacture of liquid crystal indicators, it has been found possible today to obtain homogeneous layer thicknesses, even for indicators of large surface, so that a uniform coloration of the liquid crystal indicator occurs which is dependent upon its thickness. This color usually lies in the red region. The yellowish color of the incandescent lamp which is necessary for the illumination of the LCD indicator is usually superimposed on the effects just described. The coloration can be eliminated if the indicating device has a transparent foil of the complementary color covering its entire surface. This same result can be obtained if the whole surface of the LCD indicator is printed with a complementary color which is itself transparent. It is thus possible to obtain a color shift, for example from a brown to a neutral gray, more or less approaching the black that would be obtained in the ideal case.

Figure 1:
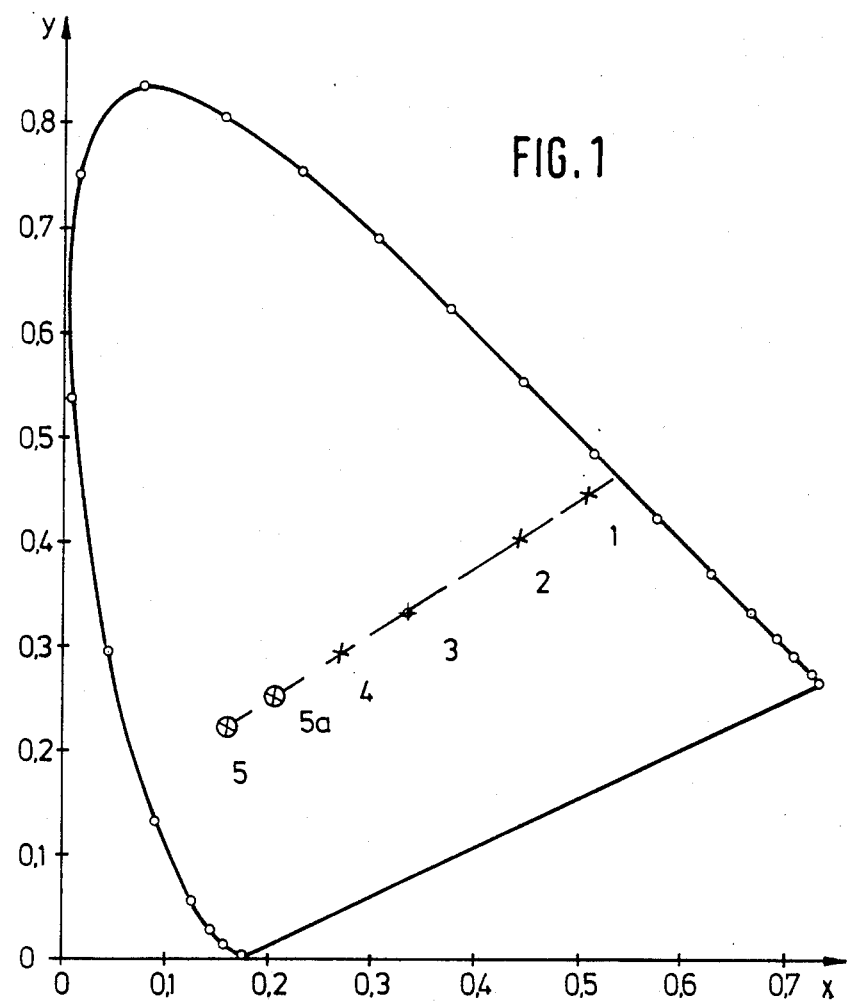
FIG. 1 is a color table or graph on which are plotted color points of a liquid crystal display to which the method of the invention is applied.

The basic mode of operation of the method is explained in more detail with reference to FIG. 1. FIG. 1 is the standard color table according to the DIN 5033 norm. Each transmission spectrum is represented by a color range in the form of a patch or area on the graph having a midpoint which represents, by its coordinates, the particular hue.

Standard (conventional) LCD indicator devices that are illuminated, for example with a 5 watt halogen lamp, typically have the midpoint of the color range of LCD segments that are not electrically turned on at the point 1 on the graph and the midpoint of the color range of the turned-on segments at point 2. The transmitted radiation, as it is presented to the observer, accordingly lies in the red region, both in the turned-on condition and in the unactivated condition of the device, and has a strong maximum in the red region. The spectral distribution of the transmitted light, and accordingly the color range midpoint on the graph for the device of FIG. 1, can be changed by a colored transparent overlay or by printing color on the display. If a dye with little transmission in the red region is chosen, e.g. blue, of which the center of the color range lies in point 5 in FIG. 1, the color range midpoint of a segment that is not turned on will be shifted from point 1 to point 3, so that the indication has a neutral gray aspect. The point 3 in FIG. 1 represents the hueless or achromatic point of the color table. If a segment of the indicator is turned on, the color range midpoint of the turned-on segments is shifted to point 4 in the case of the coloring overlay or printing just described. The turned-on segment will accordingly appear lightly bluish or greenish. According to the choice of the color range of the complementary color, this method makes possible the color shift of the non-turned-on zones of the display to a hueless appearace with at the same time, for example, a blue tinting of the turned-on segment or the color shift to a neutral white for the turned-on segment with, at the same time, residual coloring of the zones not turned on. With other color ranges on the table for the complementary color, it is possible to have the non-turned-on segments lightly reddish while the turned-on segments are imparted a light blue stain. For this purpose, the complementary color which is applied as a foil or printed on, must be so chosen that the color locations of the non-turned-on and of the turned-on segments are disposed, for example, symmetrically with respect to the hueless point 3.

Figure 2A:
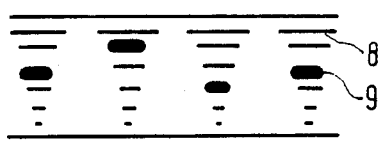
FIGS. 2a and 2b are schematic diagrams of a liquid crystal cell showing the behavior of a dichroic coloring material admixture to the liquid crystal material, FIG. 2a showing the non-turned-on condition and FIG. 2b the turned-on condition.
Figure 2B:
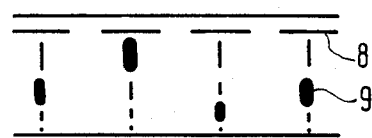

In order to obtain a neutral hueless visual color impression, both for the turned-on and for the non-turned-on segments, it is also possible to mix in one or more dichroic coloring materials into the liquid crystal itself. The dichroic material is so chosen regarding its concentration in spectral behavior, that it has strong absorption in the red region in its "absorbing" condition, and in the non-absorbing condition a weak red absorption. The color of the dichroic coloring material must accordingly be light blue. This procedure is represented in more detail in FIGS. 2a and 2b. The dichroic coloring material 9 takes its position in the liquid crystal 8 as shown. In FIG. 2a the condition in which the crystal is not turned on is represented. Because of the molecular position of the dye molecules, these have a strong absorbing effect. In FIG. 2b, there is shown the condition in which a crystal is not turned on. While the edge zones of the liquid crystal 8 do not change position because of adherence to the surface, the remaining liquid crystal molecules are rotated by the electrical field. At the same time, the dye molecules interspersed in the liquid crystal are also rotated, so that now only a weak absorption is produced.

The color range of the dye molecule is accordingly to be chosen so that the basic coloration of the LCD and the absorption behavior of the dichroic dye are sufficiently complementary in the non-turned-on condition of the indicator that the entire indicator appears neutral with respect to color. If a dichroic layer is involed, that means that the complementary color does not have the color, for example, of the color range center 5 in FIG. 1, but rather a color that lies closer to the hueless point 3. That is for example the point 5a. By the active superposition of the absorbing dichroic dye, the indicating device as a whole appears hueless (color range midpoint 3).

In the turned-on condition, the absorption of the dichroic dye 9 is almost eliminated by the rotation of the liquid crystal. Thus, the dye which is incorporated in the liquid crystal now contributes hardly at all to the shift of the color location. For this reason, there occurs only a slight shift of hue in the turned-on condition. The liquid cell accordingly is hueless to the observer, even in the turned-on condition.

By the procedures above described, a decisive improvement of the optical virtual image of a liquid crystal indication is possible, especially in negative contrast. Disturbing colors which are unavoidable because of the physical properties of the liquid crystal are suppressed and at the same time a contrast improvement is obtained. Furthermore, it is possible in a simple way to accomplish a slight color adjustment to the color temperature of the light source used to illuminate the device.

The invention is not limited only to producing color shifts to the hueless condition (point 3) in liquid crystal indicators. It is also possible to select other color ranges in the color table to produce resulting colorations which the LCD indicator is desired to present to the observer. This can be done by a suitable choice of the complementary color covering layer or of the dichroic dye applied to or mixed into the liquid crystal.

EXAMPLE 1

A complementary color film according to the invention was applied to a liquid crystal display device utilizing a liquid display crystal material of the following kind: PCH/BCH-mixture from Merck known as ZLI 1694. (PCH=Phenylcyclohexan, BCH=Biphenylcyclohexan).

The coloring film was applied by printing a material having the viscosity of a printing ink onto the surface of the liquid crystal display. The material was printed or pressed on with a roller and consisted of 7.5 g. of a blue dye known as PK 62 dispersed in 92.5 g PK 70 as a spreading medium, both materials available from Wiederhold, Nürnberg, Germany.

When the applied layer was dried and the liquid crystal display was illuminated by a small halogen lamp, the entire surface of the liquid crystal indicator had a hueless aspect.

EXAMPLE 2

A liquid crystal material of the following composition: ZLI 1694 from Merck, was mixed with a small amount of a dichroic blue dye (anthraquinone type) identified as RO 15-1684 from Hoffmann-La Roche. 15 mg. of the dye were dispersed in 1 g. of the liquid crystal material. A negative contrast liquid crystal display device was made using the material and was illuminated with a halogen vapor lamp.

When the display segments were not turned on, the resulting appearance was hueless (black). When the indicator segments were turned on, their appearance was also hueless (white).

We claim:

1. Method of producing color-neutral negative-contrast liquid, crystal display indicators of reduced residual transmission visibility in which a liquid crystal material is provided in said display comprising the additional step of:

mixing dichroic coloring material into the liquid crystal material of a twisted nematic (TN) liquid crystal display cell, said coloring material being of a color and in relative quantity for complementing the residual transmission color of said liquid crystal display in its inactivated state, and said liquid crystal material having a hueless appearance when mixed with said dichroic coloring material.

2. Method according to claim 1, in which said dichroic coloring material has a property of light absorption that varies according to whether said liquid crystal display is or is not turned on.

3. Method of producing color-neutral negative-contrast LCD indicators of reduced residual transmission visibility comprising the steps of:

filling a conventional twisted nematic (TN) cell with its appropriate liquid crystal material to produce a negative-contrast liquid crystal display having a display surface including a dark background portion, and covering said display surface, including all of said dark background portion, thereof with a transparent film of a color complementary to the liquid crystal residual transmission color of said liquid crystal display in its inactivated state, and of a color intensity for complementing the color of said liquid crystal residual transmission in the inactivated state of said liquid crystal display presenting a hueless appearance.

4. Method according to claim 3, in which the covering of said display surface with said transparent film is formed by pressing or printing a viscous hardenable transparent material on said display surface.

5. Method according to claim 3, in which the covering of the display surface of said liquid crystal display with said film is performed by applying a layer containing at least one dichroic coloring material of a color complementary to the liquid crystal residual transmission color in the inactivated condition of said device.

6. Method according to claim 5, in which said dichroic coloring material has a property of light absorption that varies according to whether said liquid crystal display is or is not turned on.

* * * * *